United States Patent [19]

Blaho

[11] Patent Number: 4,893,972
[45] Date of Patent: Jan. 16, 1990

[54] CUTTING TOOL

[75] Inventor: Lester J. Blaho, Monaca, Pa.

[73] Assignee: Pittsburgh Tube Company, Monaca, Pa.

[21] Appl. No.: 273,275

[22] Filed: Nov. 18, 1988

[51] Int. Cl.⁴ ............................................. B23D 1/24
[52] U.S. Cl. .................... 409/299; 219/61.12; 409/294; 409/298
[58] Field of Search ............... 409/299, 140, 294, 297, 409/298; 219/61.12

[56] References Cited

U.S. PATENT DOCUMENTS

| | | | |
|---|---|---|---|
| 2,379,238 | 6/1945 | Johnston | 409/249 |
| 3,028,469 | 4/1962 | Bognar | 228/13 |
| 3,054,883 | 9/1962 | Stanton | 219/65 |
| 3,165,028 | 1/1965 | Keska | 409/299 |
| 3,349,212 | 10/1967 | Morris et al. | 409/299 X |

FOREIGN PATENT DOCUMENTS 62-74521  4/1987  Japan ................................ 409/299

Primary Examiner—Steven C. Bishop
Attorney, Agent, or Firm—Reed, Smith, Shaw & McClay

[57] ABSTRACT

The present invention pertains to a cutting tool for removing upset from inside a tube and which does not force splatter into the inside surface of the tube. The cutting tool comprises a holder and means for enabling the tube to move along the holder. The enabling means is connected to the holder. The cutting tool is also comprised of means for removing the upset inside the tube. The removing means is connected to the holder such that as the tube moves along the holder, the removing means removes the upset from the inside of the tube. There is also means for preventing splatter from being forced into the inside of the tube by the enabling means as the tube moves along the holder. Preferably, the enabling means includes a roller connected to the holder such that the holder can roll along the tube on the roller, and the preventing means includes means for introducing fluid upstream from the roller such that the fluid prevents splatter from being rolled into the inside of the tube by the roller as the tube moves along the holder. The fluid creates a fluid barrier which forces the splatter around the roller so the splatter is not rolled into the inside surface of the tube.

13 Claims, 3 Drawing Sheets

CUTTING TOOL

FIELD OF THE INVENTION

The present invention relates to an upset removal station for upset inside a tube. More specifically, the present invention relates to an upset removal station for upset inside a tube that does not force splatter into the inside surface of the tube.

BACKGROUND OF THE INVENTION

It is well known in the tube welding process that metal strip is formed into a circular cross-section with opposing strip edges facing each other. The faces of these edges are heated to a plastic state and immediately pressed or, forged together forming a welded tube. During the pressing or, forging action the surface scale and a small portion of the parent strip metal is extruded both upward and downward simultaneously from the weld area. This extruded metal, commonly referred to as upset, is removed immediately after welding.

During the pressing, or forging action the extrusion or, upset on the inside of the tube is often at a sufficiently high temperature that small portions of the upset drip away from the extrusion. This drippage, while falling to the bottom of the welded tube, assumes a spherical shape. This drippage is quenched into the spherical shape or, beads by the liquid coolant in the bottom of the welded tube. These beads of drippage, commonly referred to as splatter, are carried along the bottom of the welded tube by the movement of the tube and entrapped liquid coolant.

Immediately following welding the tube travels to upset removal stations. Here both the outside and inside upsets are removed with carbide or ceramic metal cutting tools. The inside cutting tool is generally nested in a holder which rides on and/or is guided with rollers mounted on top and bottom of the holder. The bottom rollers of this holder is forced against the bottom inside surface of the tube by mechanical or hydraulic means forcing the holder to rise until the top rollers ride against the top inside surface of the tube. These top rollers are grooved and straddle the weld upset. The inside contained cutting tool is oriented with the top rollers to remove the upset to the original wall thickness. See U.S. Pat. No. 4,682,921 which discloses an internal upset removal station.

Since the beads of splatter are moving along the bottom inside surface with the welded tube, they are rolled into the bottom surface of the tube by the rolling action of the bottom rollers against the bottom surface of the welded tube. This rolled-in splatter is considered a blemish in some tube applications, i.e., tubing for hydraulic or air cylinder usage, and is a cause for rejection of the tube.

SUMMARY OF THE INVENTION

The present invention pertains to a cutting tool for removing upset from inside a tube and which does not force splatter into the inside surface of the tube. The cutting tool comprises a holder and means for enabling the tube to move along the holder. The enabling means is connected to the holder. The cutting tool is also comprised of means for removing the upset inside the tube. The removing means is connected to the holder such that as the tube moves along the holder, the removing means removes the upset from the inside of the tube. There is also means for preventing splatter from being forced into the inside of the tube by the enabling means as the tube moves along the holder.

Preferably, the enabling means includes a roller connected to the holder such that the holder can roll along the tube on the roller, and the preventing means includes means for introducing fluid upstream from the roller or rollers such that the fluid prevents splatter from being rolled into the inside of the tube by the roller as the tube moves along the holder. The fluid creates a fluid barrier which forces the splatter around the roller so the splatter is not rolled into the inside surface of the tube.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
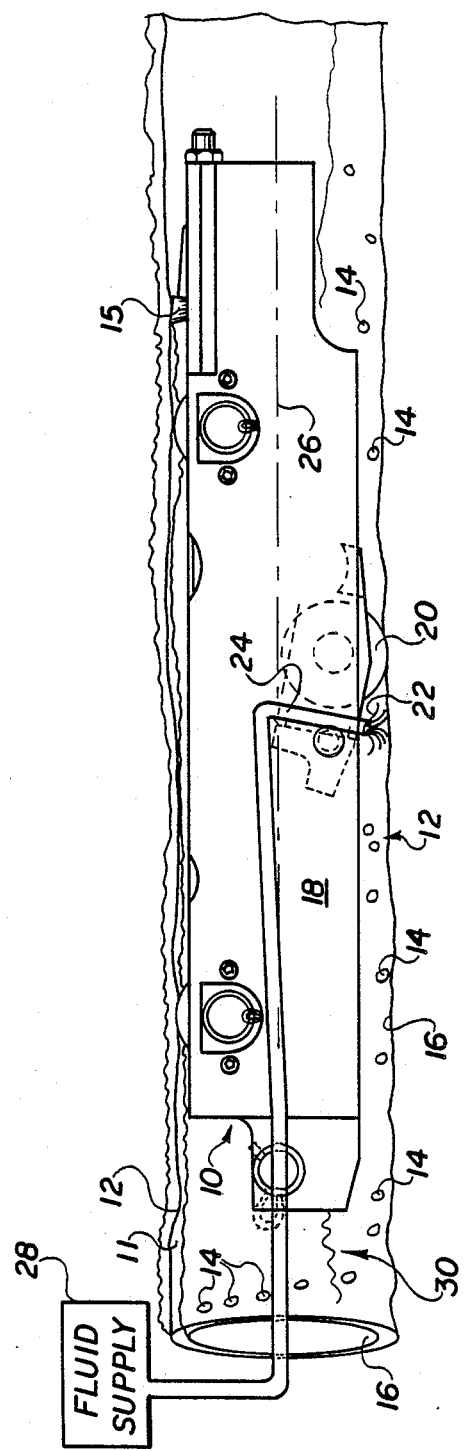
FIG. 1 is a partial cross-sectional view of a cutting tool in a tube.

Referring now to the drawings wherein like reference numerals refer to similar or identical parts throughout the several views and more specifically to FIG. 1 thereof, there is shown a partial cross-sectional view of a cutting tool 10 for removing upset from inside a tube 12 and which does not force splatter 14 into the inside 16 of the tube 12.

The cutting tool 10 comprises a holder 18 and means for enabling the tube to move along the holder 18. The enabling means is connected to the holder 18. The cutting tool 10 is also comprised of means for removing the upset 11 from the inside surface 16 of the tube 12. The removing means is, for example, a scarfing blade 15, connected to the holder 18 such that as the tube 12 moves along the holder 18, the scarfing blade 15 removes the upset 11 from the inside surface 16 of the tube 12. The cutting tool 10 is also comprised of means for preventing splatter 14 from being forced into the inside surface 16 of the tube by the enabling means as the tube 12 moves along the holder 18.

Preferably, the enabling means includes a roller 20 connected to the holder 18 such that the holder 18 can roll along the tube 12 on the roller 20. The preventing means preferably includes means for introducing fluid 22 upstream from the roller 20 such that the fluid 22 prevents splatter 14 from being rolled into the inside surface 16 of the tube 12 by the roller 20 as the tube 12 moves along the holder 18. Preferably, the fluid introducing means is connected to the holder 18. The fluid can, for example, be water, air or preferably a coolant.

The fluid introducing means is preferably a second tube 24 disposed in the holder 18 and upstream from the roller 20 that causes fluid 22 passing therethrough to be directed upstream from the roller 20 such that a fluid barrier is created which prevents splatter 14 from being rolled by the roller 20 as the tube 12 moves along the holder 18. The fluid 22 passing through the second tube 24 preferably forms a stream of fluid essentially perpendicular to the axis 26 of the tube 12. The stream of fluid 22 does not necessarily have to be directed perpendicular to the axis 26 of the tube 12 but it can also be angled slightly away from the holder 18 so that splatter 14 is forced away from the roller 20 by the fluid barrier created by the stream 22.

Figure 2:
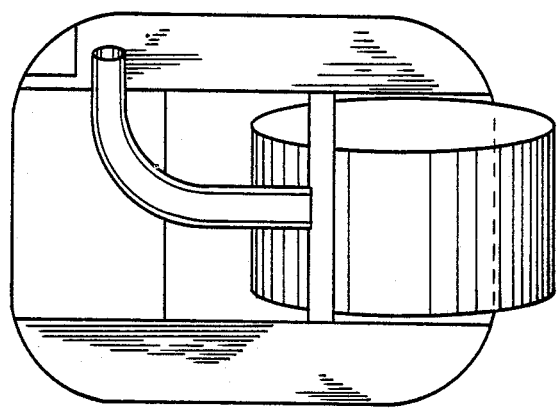
FIG. 2 is an axial cross-sectional view.

The preventing means can include a fluid supply 28 fluidically connected to the second tube 24 to provide fluide 22 thereto. FIG. 2 is an axial partial cross-sectional view of the cutting tool 10.

Figure 3:
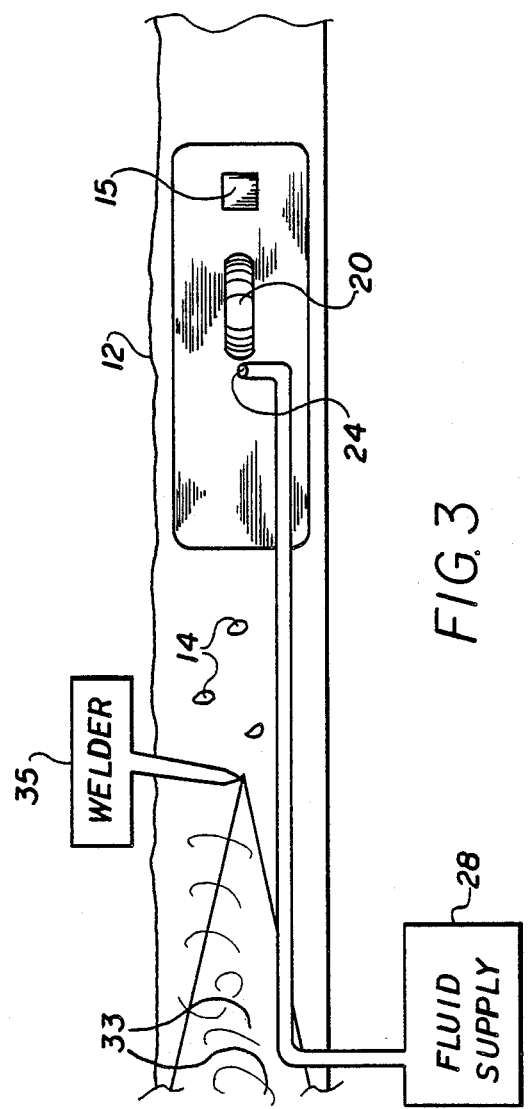
FIG. 3 is a partial overhead view of the cutting tool in a tube.

In the operation of the preferred embodiment, the upset is formed on the inside surface 11 of the tube 12 as a result of the steel 33 being forged together by welder 35. Splatter 14 is carried along the bottom of the welded tube 12 by the movement of the tube 12 and entrapped liquid coolant 30 therein. In order to prevent the splatter 14 from being rolled into the inside surface 11 of the tube 12 by the rolling action of the roller 20 of the holder 18 as the tube 12 moves along it, a stream of coolant 22, supplied by the fluid supply 28, as shown in FIG. 3, is directed down perpendicularly with respect to the axis 26 of the tube 12 such that the stream of coolant 22 creates a fluid barrier perpendicular to the travel of the splatter 14 laden coolant 30. This fluid barrier directs the splatter 14 laden coolant 30 around both sides of the roller 20. The splatter then flows past the holder 18 after passing by either side of the roller 20 without being rolled into the inside surface 11 of the tube 12.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A cutting tool for removing upset from inside a tube and which does not force splatter into the inside surface of the tube comprising:
    a holder;
    means for enabling the tube to move along the holder, said enabling means connected to said holder and in contact with a bottom of the inside surface of the tube;
    means for removing the upset from the inside surface of the tube, said removing means connected to the holder such that as the tube moves along the holder, the removing means removes the upset from the inside surface of the tube; and
    means for preventing splatter from being forced into the inside surface of the tube by the enabling means as the tube moves along the holder by introducing fluid upstream from the enabling means to form a fluid barrier therewith which prevents splatter from being forced into the inside surface of the tube.

2. A tool as described in claim 1 wherein the enabling means includes a roller connected to the holder such that the holder can roll along the tube on the roller which is in contact with the bottom of the inside surface of the tube; and wherein the fluid prevents splatter from being rolled into the inside surface of the tube by the roller as the tube moves along the holder.

3. A tool as described in claim 2 wherein the fluid is introduced by a fluid introducing means which is connected to the holder.

4. A tool as described in claim 3 wherein the fluid introducing means is a second tube disposed in the holder and upstream from the roller.

5. A tool as described in claim 4 wherein the tube has an axis and fluid passing through the second tube forms a stream of fluid essentially perpendicular to the axis.

6. A tool as described in claim 5 wherein the removing means is a scarfing blade.

7. A tool as described in claim 6 wherein the preventing means includes a fluid supply fluidically connected to the second tube to provide fluid thereto.

8. A cutting tool for removing upset from inside a tube and which does not force splatter into the inside surface of the tube comprising:
    a holder;
    a means for enabling the tube to move along the holder, said enabling means connected to said holder;
    a means for removing the upset from the inside surface of the tube, said removing means connected to the holder such that as the tube moves along the holder, the removing means removes the upset from the inside surface of the tube; and
    a means for preventing splatter from being forced into the inside surface of the tube by the enabling means as the tube moves along the holder by introducing fluid upstream from and essentially perpendicualar to the enabling means to form a fluid barrier therewith which prevents splatter from being forced into the inside surface of the tube.

9. A tool as described in claim 8 wherein the enabling means includes a roller connected to the holder such that the holder can roll along the tube on the roller and the fluid is introduced essentially perpendicular to the roller to form the fluid barrier.

10. A tool as described in claim 9 wherein the fluid is introduced by a fluid introducing means which is connected to the holder.

11. A tool as described in claim 10 wherein the fluid introducing means is a second tube disposed in the holder upstream from the roller.

12. A tool as described in claim 11 wherein the removing means is a scarfing blade.

13. A tool as described in claim 12 wherein the preventing means includes a fluid supply fluidically connected to the second tube to provide fluid thereto.

* * * * *